United States Patent
Yamamoto

(10) Patent No.: US 8,282,530 B2
(45) Date of Patent: Oct. 9, 2012

(54) SHIFT CONTROL SYSTEM AND METHOD

(75) Inventor: Takayuki Yamamoto, Aichi-gun (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 802 days.

(21) Appl. No.: 12/514,455

(22) PCT Filed: Feb. 21, 2008

(86) PCT No.: PCT/IB2008/000384
§ 371 (c)(1),
(2), (4) Date: May 12, 2009

(87) PCT Pub. No.: WO2008/102242
PCT Pub. Date: Aug. 28, 2008

(65) Prior Publication Data
US 2010/0048352 A1 Feb. 25, 2010

(30) Foreign Application Priority Data
Feb. 23, 2007 (JP) .................................. 2007-044682

(51) Int. Cl.
*B60W 10/00* (2006.01)
(52) U.S. Cl. ................................ 477/92; 477/71; 477/95
(58) Field of Classification Search ..................... 477/71, 477/75, 92, 94, 95
See application file for complete search history.

(56) References Cited

U.S. PATENT DOCUMENTS

| 5,736,923 | A  | 4/1998 | Saab |
| 6,401,899 | B1 | 6/2002 | Kanehisa et al. |
| 6,878,096 | B1 | 4/2005 | Winner et al. |
| 2002/0145333 | A1 | 10/2002 | Faye |

FOREIGN PATENT DOCUMENTS

| DE | 198 38 885 A1 | 3/2000 |
| DE | 10 2004 008 610 | 9/2005 |

(Continued)

OTHER PUBLICATIONS

German Office Action issued Jul. 5, 2011, in Patent Application No. DE 11 2008 000 460.9 (with English translation).

*Primary Examiner* — Justin Holmes
(74) *Attorney, Agent, or Firm* — Oblon, Spivak, McClelland, Maier & Neustadt, L.L.P.

(57) ABSTRACT

When the driver makes a request for switching the shift range to the P range despite that the vehicle has not yet stopped completely, the wheel cylinder pressure is maintained at a brake hold pressure Ph for a while, rather than switching the shift range to the P range immediately. At this time, more specifically, the wheel cylinder pressure is maintained at the brake hold pressure Ph for a brake hold duration $\Delta t$ within which the vehicle is estimated to stop, and when the brake hold duration $\Delta t$ has passed, the shift range is switched to the P range. After the lock mechanism is actuated to establish the P range, the wheel cylinder pressure is gradually reduced from the brake hold pressure Ph at a given pressure reducing gradient.

12 Claims, 7 Drawing Sheets

FOREIGN PATENT DOCUMENTS

| | | |
|---|---|---|
| DE | 10 2004 039 467 | 2/2006 |
| DE | 10 2005 001 838 | 8/2006 |
| DE | 10 2005 023 244 A1 | 12/2006 |
| EP | 1 103 744 | 5/2001 |
| JP | 63 297154 | 12/1988 |
| JP | 1 122764 | 5/1989 |
| JP | 4 118343 | 4/1992 |
| JP | 5 278597 | 10/1993 |
| JP | 2001 153225 | 6/2001 |
| JP | 2002 122236 | 4/2002 |
| JP | 2003 137082 | 5/2003 |

F I G . 3
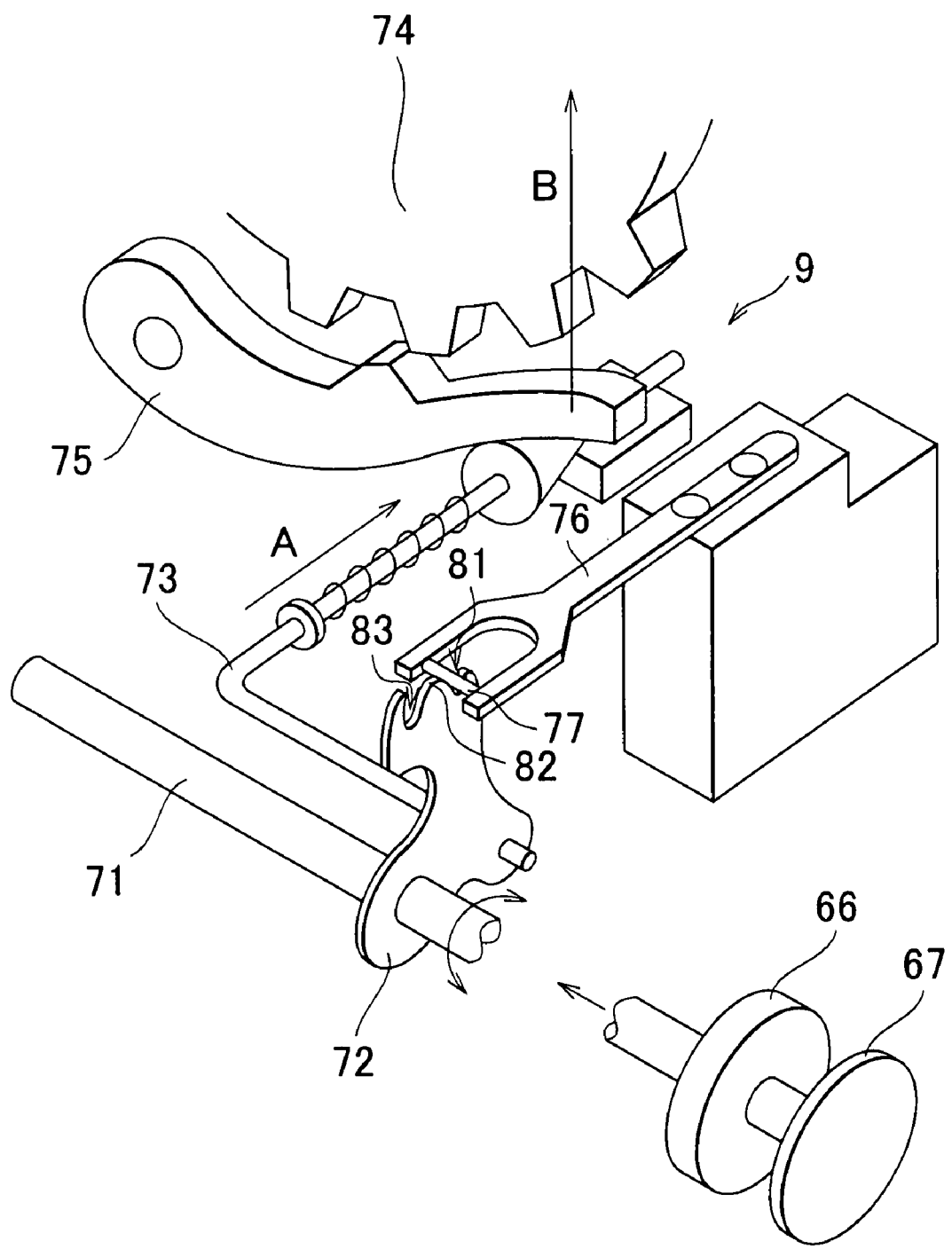

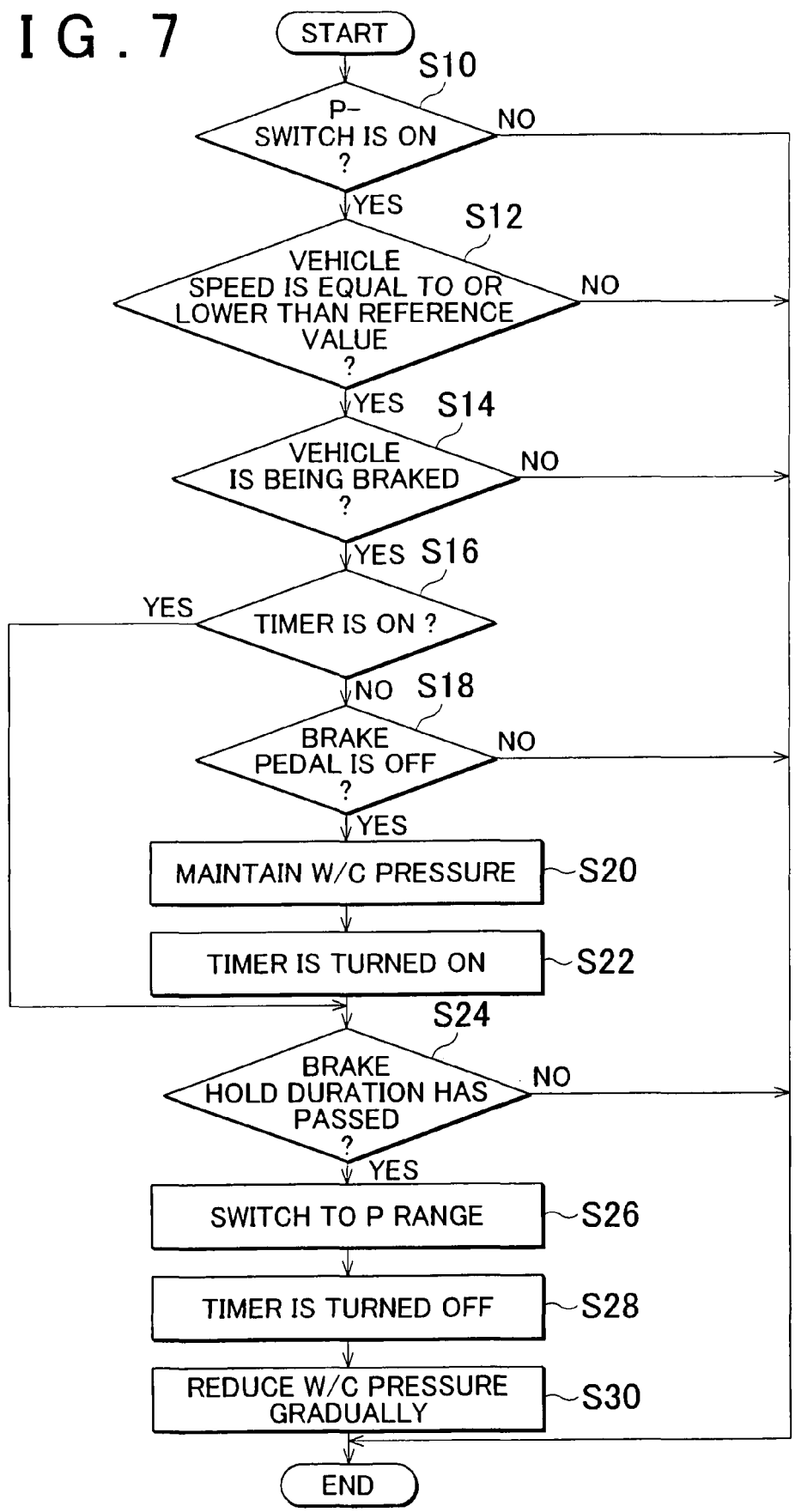

SHIFT CONTROL SYSTEM AND METHOD

BACKGROUND OF THE INVENTION

1. Field of the Invention

The invention relates to a shift control system for vehicles and in particular to a shift control system for changing the shift range of an automatic transmission in response to shift operation by the driver.

2. Description of the Related Art

In general, a shift lever to be operated by a driver is provided in vehicles with an automatic transmission. As the driver slides the shift lever, a shift range corresponding to the position of the shift lever is selected, whereby the power transfer state of the geared power transfer mechanism of the automatic transmission is changed accordingly. Shifting the shift lever to the parking position corresponding to the parking range (will be referred to as "P range") activates a lock mechanism to hold a parking gear formed integrally on the output shaft of the power transfer mechanism, whereby the output shaft is locked and thus the vehicle is maintained in a stopped state.

In recent years, so-called shift-by-wire shift control systems have been used in place of mechanical shift control systems that operate in response to shift lever operations (For example, refer to Japanese patent application publication No. 2002-122236 (JP-A-2002-122236). In shift-by-wire shift control systems, shift operations by the driver are detected by various sensors and switches, and a shift range determined based on their detection signals is established. The P range can be established by operating a parking switch (will be referred to as "P switch") with one-touch of the driver's finger.

In shift-by-wire shift control systems, however, the shift range may be switched to the P range in response to the P switch being turned on even when the vehicle has not yet completely stopped. In this case, the rotating output shaft is forcibly locked by the lock mechanism, and the resultant reaction force causes the vehicle to rock, making the driver feel uncomfortable, and moreover, vibrations occur due to backlashes at the gears of the power transfer mechanism.

SUMMARY OF THE INVENTION

The invention provides a shift control system that reduces the possibility that the driver feel uncomfortable when he or she operates a P switch while the vehicle is coming to a stop.

An aspect of the invention relates to a shift control system that controls the power transfer state of a power transfer mechanism of a vehicle in accordance with a shift operation by the driver. The shift control system includes: a shift operation input portion to which a shift operation by the driver is input; a shift control portion that switches the shift range in accordance with the shift operation by the driver and electrically controls the power transfer state of the power transfer mechanism; a brake control portion that applies braking force to the wheels of the vehicle by controlling a wheel cylinder pressure by controlling the opening and closing of an electromagnetic valve provided in a hydraulic circuit in response to a brake pedal being stepped down; and a vehicle speed detection portion that detects the speed of the vehicle. When a shift operation requesting the shift range to be switched to a parking range is input while the vehicle is running, the shift control portion maintains the wheel cylinder pressure at a given hold pressure for at least a given hold duration, and after the hold duration has passed, the shift control portion switches the shift range to the parking range by actuating a lock mechanism that locks the output shaft of the power transfer mechanism.

According to the shift control system described above, when the driver inputs a request for switching the shift range to the P range despite that the vehicle has not yet stopped completely, the wheel cylinder pressure is maintained at the hold pressure, rather than switching the shift range to the P range immediately. At this time, more specifically, the wheel cylinder pressure is maintained for the hold duration and then the shift range is switched to the P range. This procedure ensures that the lock mechanism is actuated when the vehicle is in a stable state, and this eliminates or reduces the possibility of rocking of the vehicle which may make the driver feel unconformable.

The above-described shift control system may be such that when the vehicle speed detected by the vehicle speed detection portion has become substantially zero and the amount of depression of the brake pedal detected by the brake operation detection portion has become substantially zero, the wheel cylinder starts to be maintained at a hold pressure that is lower than the pressure obtained when the brake pedal is being stepped down.

That is, it is considered that the driver normally selects the P range when the driver realizes that the vehicle has stopped after stepping down the brake pedal. In some cases, the driver may misunderstand that the vehicle has stopped completely while it has not actually, and in such a case, the driver may remove his or her leg from the brake pedal and switches the shift range to the P range by operating the P switch, or the like, despite that the vehicle has not yet stopped completely. To cope with this, the above-described shift control system maintains the wheel cylinder pressure at the hold pressure, which is lower than the wheel cylinder pressure obtained when the brake pedal is being stepped down, so as to stop the vehicle completely, rather than allowing the wheel cylinder pressure to become zero. The reason why the wheel cylinder pressure starts to be maintained at the hold pressure after the vehicle speed detected by the vehicle speed detection portion becomes substantially zero is as follows. For example, when a wheel speed sensor, or the like, is used as the vehicle speed detection portion, the vehicle speed can not be detected beyond a certain extremely low level in some cases. The vehicle rocks even when the lock mechanism is actuated while the vehicle is moving at an extremely low speed. The invention prevents such rocking of the vehicle.

The above-described shift control system may further include a stop state determination portion that determines, based on the behavior of the vehicle, whether the vehicle has stopped, and the hold duration may be set to a time period until the stop state determination portion determines that the vehicle has stopped. That is, in this case, the hold duration is not fixed, but it is variably set in accordance with the state of the vehicle. As such, the control can be more precisely performed based on the stop state of the vehicle, and it is possible to prevent the wheel cylinder pressure from becoming higher than necessary.

The above-described shift control system may further include a G-sensor that detects the deceleration of the vehicle, and the stop state determination portion may determine that the vehicle has stopped when the vehicle speed detected by the vehicle speed detection portion has become substantially zero and the output value of the G-sensor has substantially converged on zero. The vehicle may rock in its longitudinal direction due to inertia, or the like at the moment the vehicle stops completely. For example, the vehicle may be determined to have stopped when the pulsation of the output signal of the G-sensor ends.

The above-described shift control system may further include a vehicle height sensor that detects the height of the vehicle, and the stop state determination portion may determine that the vehicle has stopped when the vehicle speed detected by the vehicle speed detection portion has become substantially zero and the difference between the vehicle height detected by the vehicle height sensor and a vehicle height that was detected in advance when the vehicle was not moving is smaller than a reference value. That is, the vehicle may vibrate up and down at the moment the vehicle stops. At this time, the height of the vehicle detected by the vehicle height sensor becomes different from the value obtained when the vehicle is stopped. Thus, the stop state of the vehicle may be determined based on such variation of the output value of the vehicle height sensor.

The hold duration may be set such that the larger the deceleration of the vehicle at a given time point immediately before the vehicle stops, the shorter the hold duration. That is, the larger the deceleration of the vehicle immediately before the vehicle stops, the shorter the time period to when the vehicle stops. Therefore, it is desirable to set the hold duration appropriately in consideration of the stability and quickness in switching the shift range to the P range.

Further, after switching the shift range to the parking range, the shift control portion may cause the brake control portion to reduce the wheel cylinder pressure gradually from the hold pressure. If the wheel cylinder pressure is reduced from the hold pressure at a given gradient, the shocks on the vehicle are suppressed, and therefore the vehicle can be stopped in a more stable manner.

Accordingly, the shift control system of the invention eliminates or reduces the possibility that the driver feel uncomfortable when he or she operates the P switch while the vehicle is coming to a stop.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 3 is a view illustrating the main structure of the shift drive portion;

FIG. 7 is a flowchart illustrating the main processes of the shift control procedure of the example embodiment.

DETAILED DESCRIPTION OF THE EMBODIMENTS

Figure 1:
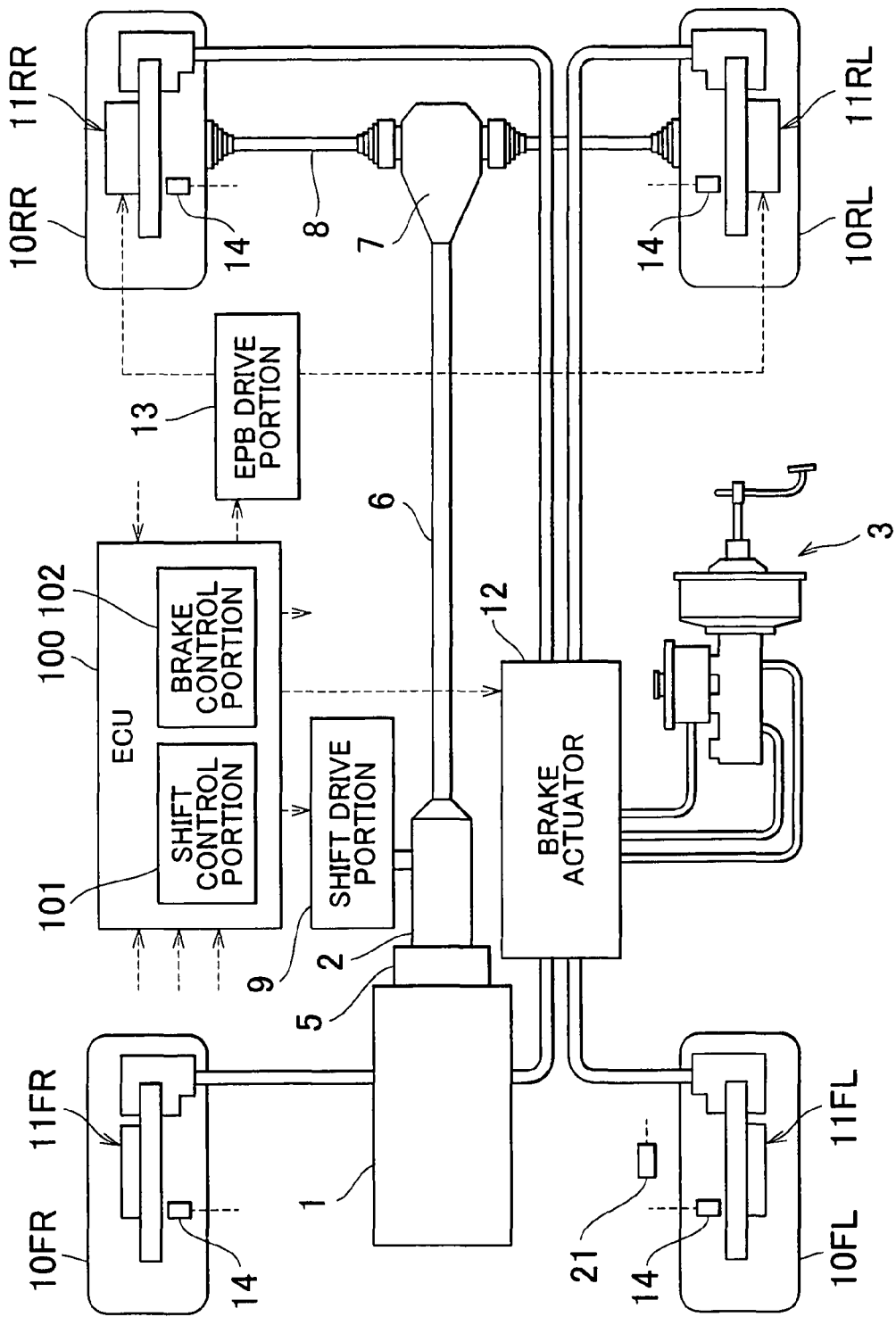
FIG. 1 is a view showing the overall configuration of a shift control system according to an example embodiment of the invention.

Hereinafter, example embodiments of the invention will be described in detail with reference to the drawings. FIG. 1 is a view showing the overall configuration of a shift control system according to an example embodiment of the invention.

Referring to FIG. 1, the vehicle of this example embodiment has an engine 1 that serves as a source of drive power for the drive wheels of the vehicle, an automatic transmission 2 that transmits the drive power at a given speed ratio, a steering unit that steers the wheels of the vehicle (not shown in the drawings), a brake system 3 that applies braking forces to the respective wheels of the vehicle, various electronic control units (will be referred to as "ECUs") that control the respective components, etc. The vehicle of this example embodiment is a rear-drive vehicle, and the drive power of the engine 1 is transferred to the rear wheels via a torque converter 5, the automatic transmission 2, a propeller shaft 6, a differential 7, axle shafts 8, etc.

The automatic transmission 2 is a multi-speed transmission incorporating a geared power transfer mechanism. The power transfer state of the automatic transmission 2 is controlled according to the shift range that the driver selects through his or her shift operation. The automatic transmission 2 has a shift drive portion 9. When the P range (the parking mode) is selected, the lock mechanism in the shift drive portion 9 is actuated to lock the rotation of the output shaft of the power transfer mechanism. The shift control system of this example embodiment is adapted to execute a shift range switching control, and in particular, it executes a cooperative control between the automatic transmission 2 and the brake system 3 in the parking mode, as will be described in detail later.

The brake system 3 is provided with an electronically controlled brake (will be referred to as "ECB") and an electric parking brake (will be referred to as "EPB"), and the brake system 3 controls independently, and appropriately, the braking of each of the four wheels of the vehicle in accordance with the running condition of the vehicle. The front-right wheel 10FR and the front-left wheel 10FL are provided with disk brakes 11FR, 11FL, respectively, while the rear-right wheels 10RR and the rear-left wheel 10RL are provided with drum-in disk brakes 11RR, 11RL, respectively. The ECB is actuated by a brake actuator 12, and the EPB is actuated by an EPB drive portion 13. Mode detail on this brake system will be later described.

Wheel speed sensors 14 are provided at the respective wheels of the vehicle. A G-sensor 21 for detecting the longitudinal acceleration of the vehicle is provided at the front side of the vehicle body. The respective drive portions and actuators are controlled by an ECU 100. The ECU 100 has a shift control portion 101 for controlling shift operation and a brake control portion 102 for controlling brake operation. The shift control portion 101 and the brake control portion 102 are each constituted of a microprocessor including a CPU (Central Processing Unit), a ROM (Read Only Memory) storing various programs, a RAM (Random Access Memory) for temporarily recording various data, an input port, an output port, a communication port, etc. The ECU 100 receives the output signals of various sensors, switches, and the like, including the wheel speed sensors 14. The shift control portion 101 and the brake control portion 102 perform various computations and calculations using the signals input from these sensors and execute various control processes as needed.

Figure 2:
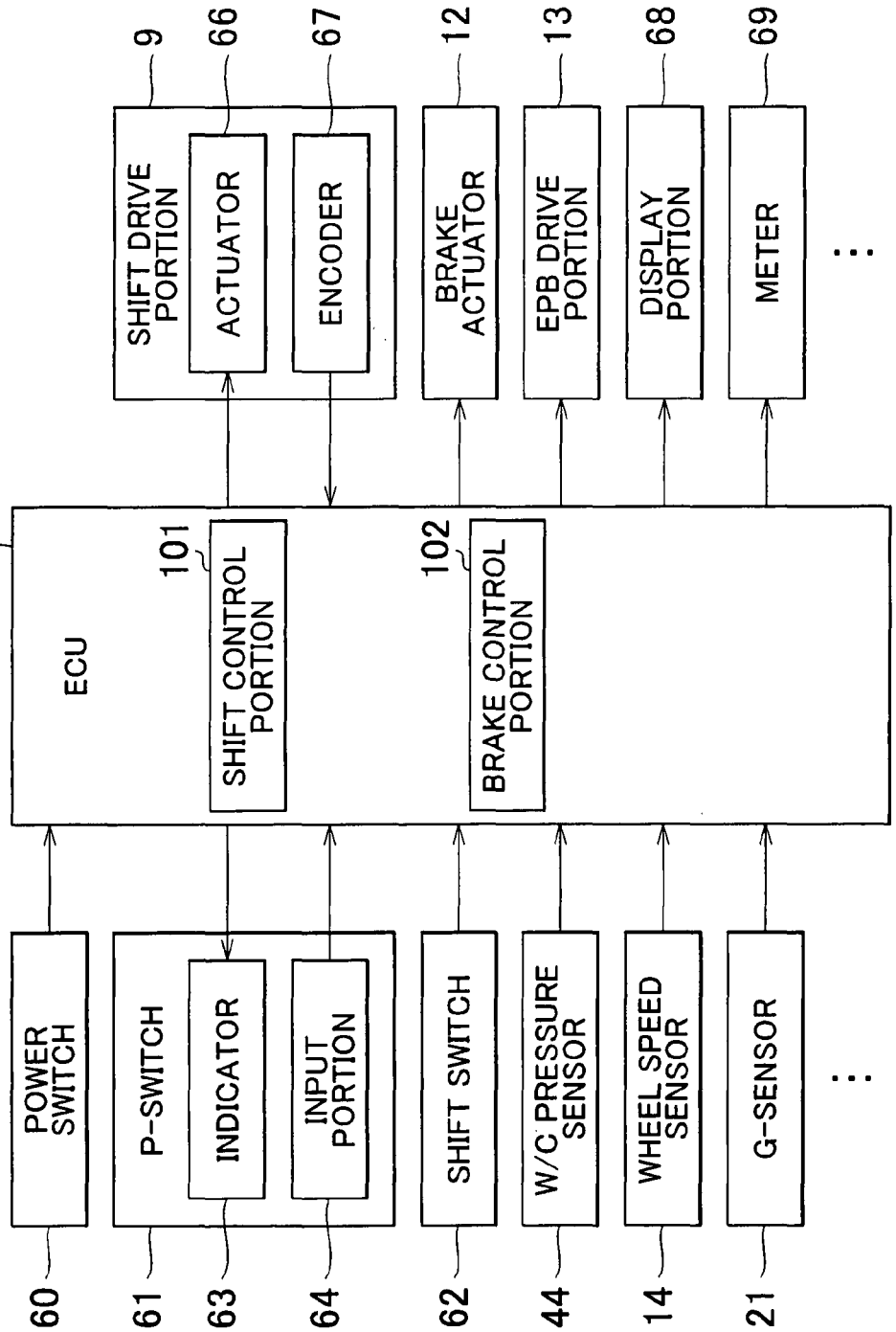
FIG. 2 is a block diagram schematically illustrating the electric configuration of the shift control system.

FIG. 2 is a block diagram schematically illustrating the electric configuration of the shift control system. The shift control system of this example embodiment is constituted of the shift control portion 101 and the brake control portion 102 as its main components and operates as a shift-by-wire system that changes the shift range through electric control. The ECU 100 is connected to various sensors and switches including a power source switch 60 for power supply, a P switch 61 that receives requests for changing the shift range to the P range, a shift switch 62 that receives requests for switching the shift range to ranges other than the P range, W/C pressure sensors 44 for detecting the pressures of wheel cylinders constituting the ECB and provided at the respective wheels of the vehicle, the wheel speed sensors 14, the G-sensor 21, etc. Further, the ECU 100 is connected to various actuators including the shift drive portion 9, the brake actuator 12, and the EPB drive portion 13, and to a display portion 68 for indicating the state of the vehicle, and the like, and a meter 69 for indicating the presently selected shift range, etc.

The power source switch 60 is used to turn the vehicle power supply on and off. When the power source switch 60 is turned on, the shift control system starts to be powered by a battery, not shown in the drawings, whereby the shift control system starts up.

The P switch 61 is used to switch the shift range between the P range and ranges other than the P range (will be collectively referred to as "non-P range"). The P switch 61 has an indicator 63 for indicating the state of the P switch 61 to the driver and an input portion 64 by which the driver inputs his or her command. The driver inputs a command for switching the shift range to the P range via the input portion 64. The input portion 64 may be a momentary switch, or the like. The shift control portion 101 switches the shift range between the P range and the non-P range by controlling the shift drive portion 9 for driving the power transfer mechanism of the automatic transmission 2 and indicates the presently selected shift range by the indicator 63. If the driver presses the input portion 64 down when the shift range is at the non-P range, the shift control portion 101 switches the shift range to the P range and indicates, on the indicator 63, that the shift range is presently at the P range.

The shift drive portion 9 has an actuator 66 for driving the power transfer mechanism of the automatic transmission 2 and an encoder 67 for detecting rotations. The actuator 66 is constituted of a switched reluctance motor (will be referred to as "SR motor"). The actuator 66 drives, in accordance with the commands from the shift control portion 101, the power transfer mechanism to change the shift range. The encoder 67 rotates together with the actuator 66 and thus detects the state of rotation of the SR motor. In this example embodiment, the encoder 67 is a rotary encoder that outputs A-phase signals, B-phase signals, and Z-phase signals. The shift control portion 101 obtains the signals output from the encoder 67 and identifies the rotation state of the SR motor from the obtained signals, and the shift control portion 101 then performs energization control for driving the SR motor.

The shift switch 62 is used to switch the shift range among the drive range (D), the reverse range (R), the neutral range (N), the brake range (B), etc. The command that the driver has input using the shift switch 62 is sent to the shift control portion 101. In accordance with this command, the shift control portion 101 executes control for switching the shift range at the power transfer mechanism and then indicates the presently selected shift range on the meter 69.

In this example embodiment, the P switch 61 and the shift switch 62 may correspond to "shift operation input portion".

The shift control portion 101 governs the overall control of the shift control system. The display portion 68 indicates the commands and warnings issued from the shift control portion 101. The meter 69 indicates the states of various vehicle components, the presently selected shift range, and so on.

FIG. 3 is a view illustrating the main structure of the shift drive portion 9. The shift drive portion 9 is constituted of a shaft 71 that is rotated by the actuator 66, a detent plate 72 that pivots as the shaft 71 rotates, a rod 73 that moves as the detent plate 72 pivots, a parking gear 74 fixed to the output shaft of the power transfer mechanism, a parking lock pole 75 for locking the parking gear 74, a detent spring 76 that fixes the shift range by restricting the pivoting motion of the detent plate 72, and a roller 77. These components together form a lock mechanism.

FIG. 3 shows a state where the shift range is at the non-P range. In this state, the parking lock pole 75 does not lock the parking gear 74 and therefore the drive shaft of the vehicle is rotatable. As the shaft 71 is rotated clockwise by the actuator 66 in the state shown in FIG. 3, the rod 73 is pushed in the direction indicated by the arrow A, whereby the parking lock pole 75 is pushed upward in the direction indicated by the arrow B by the tapered portion provided at the front end of the rod 73. At this time, as the detent plate 72 pivots, the roller 77 of the detent spring 76 moves from a non-P range position 81 (one of the two notches formed at the crown of the detent plate 72) to a P range position 83 (the other of the two notches) by going over a convex portion 82. The roller 77 is provided at the detent spring 76 such that it can rotate about its axis. As the detent plate 72 pivots to the position where the roller 77 is at the P range position 83, the parking lock pole 75 is pushed upward to the position where the parking lock pole 75 engages with the parking gear 74, whereby the drive shaft of the vehicle is mechanically locked. This is how the shift range is changed to the P position.

Figure 4:
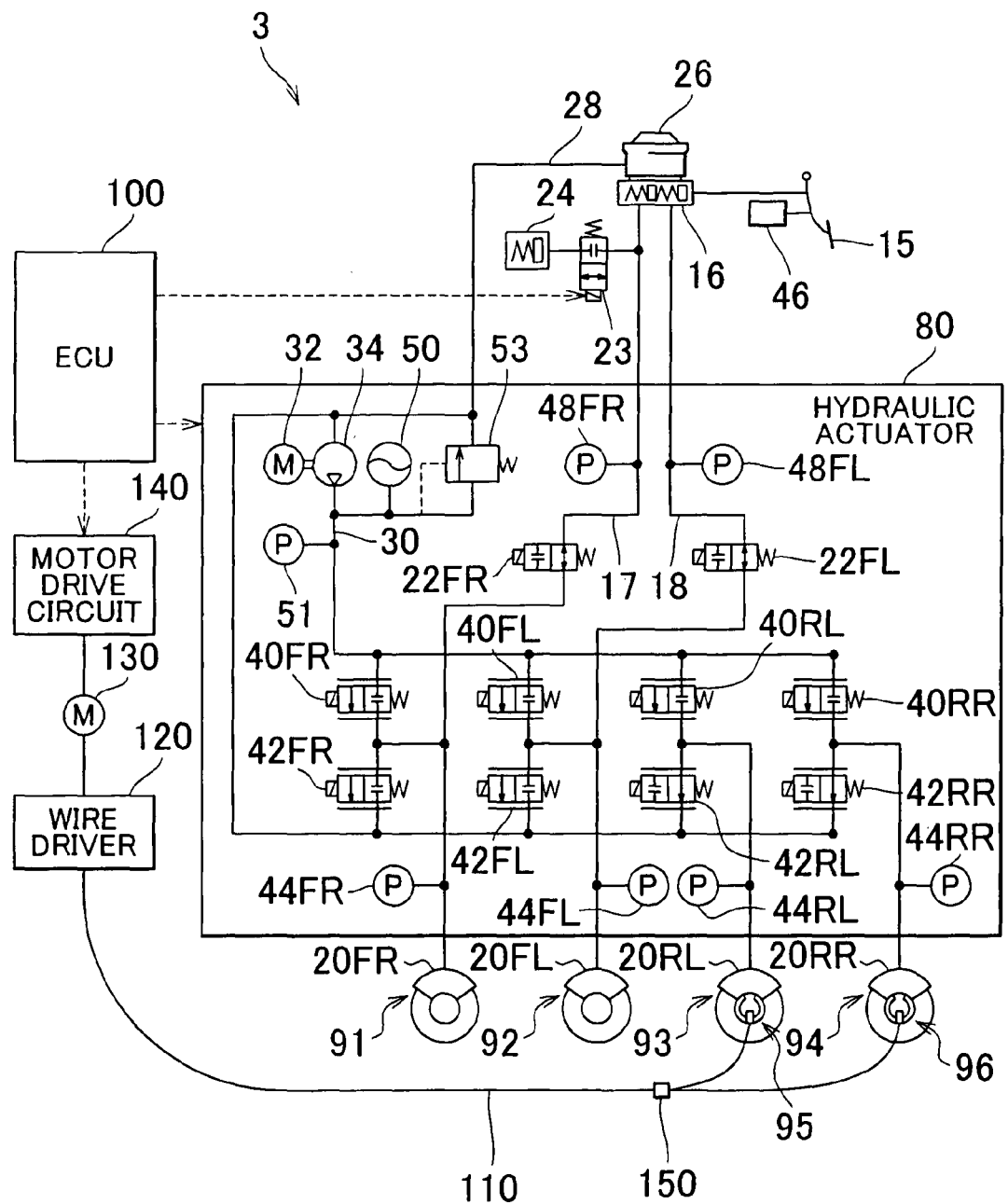
FIG. 4 is a system configuration diagram mainly showing the hydraulic circuit of the brake system of the example embodiment.

FIG. 4 is a system configuration diagram mainly showing the hydraulic circuit of the brake system of the example embodiment. As described above, the brake system 3 is provided with both the ECB and the EPB and controls the braking at each of the four wheels of the vehicle independently, and appropriately, in accordance with the running state of the vehicle. Disk brakes 91 to 94, which constitute the ECB, are provided at the front-left wheel, the front-right wheel, the rear-left wheel, and the rear-right wheel of the vehicle, respectively, and drum brakes 95, 96, which constitute the EPB, are provided at the rear-left wheel and the rear-right wheel, respectively. That is, drum-in disk brakes are provided at the rear-left wheel and the rear-right wheel, respectively.

A brake pedal 15 is connected to a master cylinder 16 that supplies brake fluid, which serves as hydraulic fluid, as the brake pedal 15 is stepped down by the driver. A pedal-travel sensor 46 is provided at the brake pedal 15 to detect the travel of the brake pedal 15. A stroke simulator 24 that produces a reactive force corresponding to the force with which the driver is operating the brake pedal 15 is connected to an output port of the master cylinder 16. A simulator cut valve 23 is provided on the hydraulic channel between the master cylinder 16 and the stroke simulator 24. A reservoir tank 26 for storing the brake fluid is connected to the master cylinder 16.

A front-right wheel brake hydraulic pressure control pipe 17 is connected to an output port of the master cylinder 16. The front-right wheel brake hydraulic pressure control pipe 17 is connected to the front-right wheel cylinder 20FR. A front-left wheel brake hydraulic pressure control pipe 18 is connected to another output port of the master cylinder 16. The front-left wheel brake hydraulic pressure control pipe 18 is connected to the front-left wheel cylinder 20FL. A right electromagnetic open-close valve 22FR is provided in the front-right wheel brake hydraulic pressure control pipe 17, and a left electromagnetic open-close valve 22FL is provided in the front-left wheel brake hydraulic pressure control pipe 18. The right electromagnetic open-close valve 22FR and the left electromagnetic open-close valve 22FL are normally-open valves that are open when not energized and are closed when energized.

A right master pressure sensor 48FR for detecting the master cylinder pressure supplied to the front-right wheel side is provided in the front-right wheel brake hydraulic pressure control pipe 17, and a left master pressure sensor 48FL for detecting the master cylinder pressure supplied to the front-left wheel side is provided in the front-left wheel brake hydraulic pressure control pipe 18.

A hydraulic pipe 28 is connected at one end to the reservoir tank 26 and at other end to the inlet of an oil pump 34 that is driven by a motor 32. The outlet of the oil pump 34 is connected to a high pressure pipe 30. An accumulator 50 and a relief valve 53 are connected to the high-pressure pipe 30.

The accumulator 50 stores the brake fluid pressurized by the oil pump 34. When the pressure of the brake fluid has increased excessively, the relief valve 53 is opened to send the high-pressure brake fluid back to the hydraulic pipe 28. An accumulator pressure sensor 51 for detecting the output pressure of the accumulator 50 is provided in the high-pressure pipe 30.

The high-pressure pipe 30 is connected to the front-right wheel cylinder 20FR via a pressure booster valve 40FR, to the front-left wheel cylinder 20FL via a pressure booster valve 40FL, to the rear-right wheel cylinder 20RR via a pressure booster valve 40RR, and to the rear-left wheel cylinder 20RL via a pressure booster valve 40RL. Hereinafter, the wheel cylinders 20FR to 20RL will be collectively referred to as "wheel cylinders 20" where necessary, and the pressure booster valves 40FR to 40RL will be collectively referred to as "pressure booster valves 40" where necessary. The pressure booster valves 40 are normally-closed type electromagnetic flow-rate control valves (linear valves) that are closed when not energized and used as needed to increase the pressures supplied to the respective wheel cylinders 20.

The front-right wheel cylinder 20FR and the front-left wheel cylinder 20FL are connected to the hydraulic pipe 28 via pressure reducing valves 42FR and 42FL, respectively. The pressure reducing valves 42FR and 42FL are normally-closed type electromagnetic flow-rate control valves (linear valves) that are used as needed to reduce the pressures supplied to the wheel cylinders 20FR and 20FL, respectively. On the other hand, the rear-right wheel cylinder 20RR and the rear-left wheel cylinder 20RL are connected to the hydraulic pipe 28 via pressure reducing valves 42RR and 42RL, respectively, which are normally-open type electromagnetic flow-rate control valves. In the following description, the pressure reducing valves 42FR to 42RL will be collectively referred to as "pressure reducing valves 42" where necessary.

The wheel cylinder pressure sensors 44FR, 44FL, 44RR, and 44RL (will be collectively referred to as "W/C pressure sensors 44") are provided near the wheel cylinders 20FR, 20FL, 20RR, and 20RL, respectively, to detect the brake fluid pressures supplied to the wheel cylinders 20FR, 20FL, 20RR, and 20RL.

The disk brakes 91 to 94 constituting the ECB are actuated by the hydraulic pressures supplied from the wheel cylinders 20FR to 20RL. Each disk brake has a brake disk that rotates together with the corresponding wheel. When braking, the brake disk is pressed against the corresponding brake pad held in the vehicle body side and the resultant frictional force brakes the rotation. The disk brakes 91 to 94 employ a known structure, and therefore they are not described in detail in this specification.

The right electromagnetic open-close valve 22FR, the left electromagnetic open-close valve 22FL, the pressure booster valves 40FR to 40RL, the pressure reducing valves 42FR to 42RL, the oil pump 34, the accumulator 50, etc. together may form a hydraulic actuator 80 of the brake system 3.

On the other hand, the drum brakes 95, 96 constituting the EPB each have a drum that rotates together with the wheel. When braking, the brake shoe held in the vehicle body side is pressed against the drum and the resultant frictional force brakes the rotation. One end of a lever is pivotably attached to one end of each brake shoe and one end of a wire 110 is connected to the other end of the lever. As the wire 110 is pulled, the lever pivots so that the brake shoe is deployed and thus pressed against the drum. The brake shoes employ a known structure, and therefore they are not described in detail in this specification.

The EPB includes the wire 110, a wire driver 120 for tensioning the wire 110, an electric motor 130 for driving the wire driver 120, etc. The electric current to be supplied to the electric motor 130 is controlled via a motor drive circuit 140. An equalizer 150 is provided at the point at which the wire 110 is branched into the portion leading to the drum brake 95 and the portion leading to the drum brake 96. The wire 110, the wire driver 120, the electric motor 130, the motor drive circuit 140, and the equalizer 150 together may form the EPB drive portion 13.

The wire driver 120 has a gear train involving a worm gear, which is not shown in the drawings. The worm gear rotates as the electric motor 130 rotates in the normal direction or in the reverse direction, whereby the wire 110 is tensioned or loosened. A ratchet mechanism is provided at a given position in the gear train of the wire driver 120 to prevent the wire 110 from being unwound while it is being wound up (while the wire 110 is being further pulled) and to hold the wire 110 at a desired winding position so that a desired braking force is achieved. When unwinding the wire 110 (when releasing the wire 110), the ratchet mechanism is released so that the braking force is canceled instantly. The tensile force applied to the wire 110 is equally transferred to the left drum brake 95 and to the right drum brake 96 via the equalizer 150.

The brake control portion 102 of the ECU 100 controls the brake actuator 12, which includes the hydraulic actuator 80, and the EPB drive portion 13, which includes the motor drive circuit 140, etc. More specifically, the ECU 100 calculates the target deceleration of the vehicle from the pedal travel of the brake pedal 15 (i.e., the amount the brake pedal 15 is stepped down) and the master cylinder pressure, and then the ECU 100 obtains, based on the calculated target deceleration, a target wheel cylinder pressure, that is, the target value of the wheel cylinder pressures for the respective wheels. Next, the ECU 100 energizes the pressure booster valve 40 and the pressure reducing valve 42 such that the wheel cylinder pressure at each wheel equals the target wheel cylinder pressure, whereby the disk brakes 91 to 94 operate as needed. When the accumulator pressure is lower than the lower limit value of a predetermined control range, the ECU 100 increases the accumulator pressure by driving the oil pump 34, and when the accumulator pressure has fallen in the control range, the ECU 100 stops driving the oil pump 34. Meanwhile, if the brake control portion 102 receives a given command from the shift control portion 101 when switching the shift range to the P range, the brake control portion 102 executes a cooperative control in which the wheel cylinder pressures are maintained at a particular brake hold pressure. This cooperative control will be described in detail later.

When an operation switch, not shown in the drawing, is operated by the driver, the brake control portion 102 activates the drum brakes 95, 96 by tensioning the wire 110 as needed by controlling the motor drive circuit 140. Further, in the case where it is necessary to cover a shortage of the braking force of the ECB, the motor drive circuit 140 is activated, irrespective of the intention of the driver, so that the EPB produces a certain braking force.

Next, the shift control method of this example embodiment will be described. Briefly, in this shift control method, if the P switch 61 is pressed by the driver when the vehicle has not yet stopped completely, the shift range is not switched to the P range immediately, and the brakes are controlled to maintain the wheel cylinder pressures and thereby brake the vehicle, and when the vehicle has come to a stable stop, the lock mechanism is activated.

Figure 5:
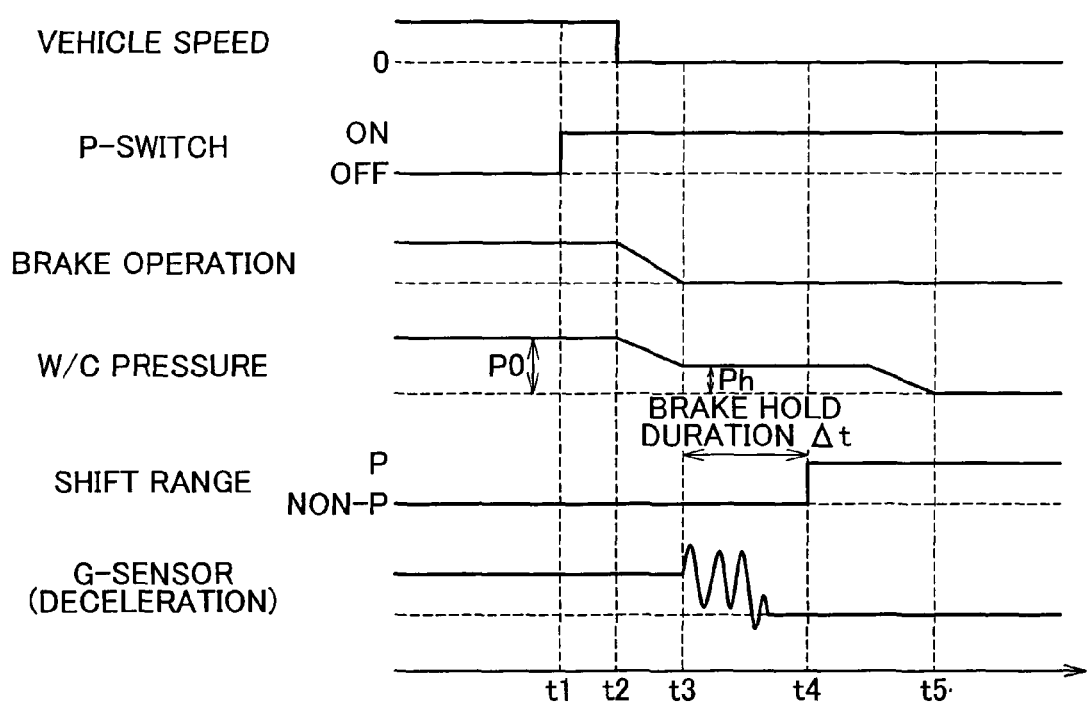
FIG. 5 is a timing chart illustrating the shift control procedure to switch the shift range to the P range.

FIG. 5 is a timing chart illustrating the shift control procedure to switch the shift range to the P range. This chart indicates, from top to bottom, whether the vehicle speed is zero, the state of the P switch 61, the operation state of the brake pedal, the wheel cylinder pressure (W/C pressure), the presently selected shift range, and the output signal of the G-sensor 21. The horizontal axis of the chart represents time. Whether the vehicle speed is zero is determined based on the output signal of the wheel speed sensors 14. However, due to the characteristics of the wheel speed sensors 14, in some cases, the vehicle speed can not be detected if the vehicle speed is extremely low (e.g., 3 km/h or lower). Therefore, in this example embodiment, it is assumed that the vehicle speed may possibly be determined to be zero despite that the vehicle has not yet stopped completely. The timing chart in FIG. 5 illustrates an example where the driver attempts to switch the shift range to the P range before the vehicle stops completely.

In the example illustrated in FIG. 5, the vehicle speed decreases after the driver steps the brake pedal 15 down and the P switch 61 is turned on at time t1 where the vehicle has not yet stopped completely. In this case, the shift control portion 101 commands the brake control portion 102 to maintain the wheel cylinder pressures for a certain period of time, rather than switching the shift range from the non-P range to the P range immediately. That is, the wheel cylinder pressures are maintained at a predetermined brake hold pressure Ph even after it is detected via the wheel speed sensors 14 at time t2 that the vehicle speed has become zero and then it is detected via the pedal-travel sensor 46 at time t3 that the driver has released the brake pedal 15. The shift control portion 101 sets the brake hold pressure Ph to a value lower than a pressure PO that is the pressure immediately before the amount of the brake operation by the driver becomes zero. The brake hold pressure Ph may be set to an appropriate value in consideration of typical states immediately before the vehicle stops, and the like. The shift control portion 101 continues to maintain the wheel cylinder pressures at the brake hold pressure Ph for at least a brake hold duration $\Delta t$ (corresponding to "hold duration") from time t3 at which the wheel cylinder pressures become equal to the brake hold pressure Ph. The brake hold duration $\Delta t$ is set to, for example, a time period that is long enough for the deceleration detected by the G-sensor 21 to converge sufficiently, that is, a time period by the end of which the pulsation of the output signal of the G-sensor 21 ends.

Figure 6:
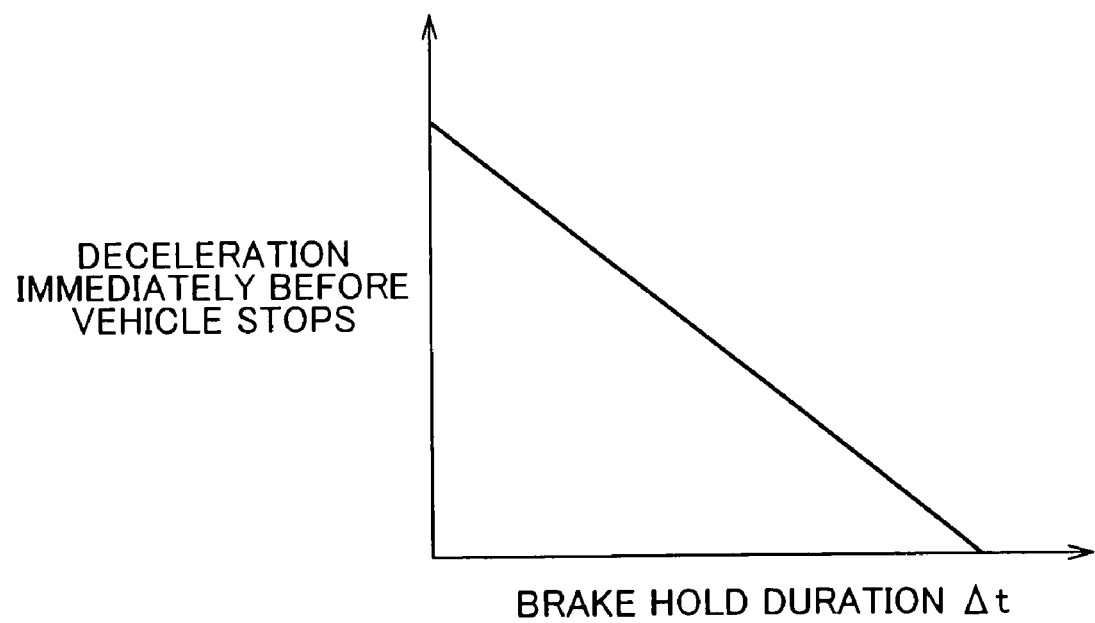
FIG. 6 is a graph indicating an example control map that is used to set the brake hold time.

FIG. 6 is a graph indicating an example control map that is used to set the brake hold time. In this graph, the horizontal axis represents the brake hold time $\Delta t$ and the vertical axis represents the deceleration of the vehicle immediately before the vehicle stops.

The shift control portion 101 incorporates the control map illustrated in FIG. 6. This control map is used to set the brake hold time $\Delta t$ based on the deceleration of the vehicle obtained immediately before the vehicle stops. The control map is formulated in advance through empirical optimizations, etc. According to the control map, the larger the deceleration of the vehicle immediately before the vehicle stops, the shorter the brake hold time $\Delta t$ is made and the smaller the deceleration of the vehicle immediately before the vehicle stops, the longer the brake hold time $\Delta t$ is made. That is, the control map illustrated in FIG. 6 is formulated by taking into consideration the fact that the larger the deceleration of the vehicle immediately before the vehicle stops, the shorter the time period to when the vehicle stops. That is, according to this control map, the brake hold time $\Delta t$ is set so as to stop the vehicle completely without making the brake hold time $\Delta t$ longer than necessary, thus achieving a quick control procedure. In this example embodiment, the brake hold time $\Delta t$ is set based on the deceleration of the vehicle detected at time t2. Note that the deceleration of the vehicle may be calculated based on the output of the wheel speed sensors 14, rather than being directly detected using the G-sensor 21.

Back to FIG. 5, at time t4 that is the brake hold time $\Delta t$ after time t3, the shift control portion 101 executes the control for switching the shift range to the P range. At this time, the actuator 66 of the shift drive portion 9 is activated to set the lock mechanism in the P range. When the operation for switching the shift range to the P range has been completed, the shift control portion 101 commands the brake control portion 102 to start reducing the wheel cylinder pressure gradually at a given pressure reducing gradient. In the example illustrated in FIG. 5, the wheel cylinder pressure reaches zero at time t5. While the wheel cylinder pressure continues to be maintained at the brake hold pressure Ph for a while even after time t4 in the example illustrated in FIG. 5, the gradual reduction of the wheel cylinder pressure may be started at the time the shift range is switched from the non-P range to the P range.

FIG. 7 is a flowchart illustrating the main processes of the shift control procedure of this example embodiment. This routine is repeatedly executed at given time intervals during the shift control procedure by the ECU 100.

First, it is determined whether the P switch 61 has been turned on (step 10). If it is determined that the P switch 61 has been turned on (step 10: YES), it is then determined based on the signals input from the wheel speed sensors 14 whether the vehicle speed is equal to or lower than a reference value (e.g., 3 km/h or lower) (step 12). In this step, the vehicle speed is determined to be equal to or lower than the reference value also when no pulses are being input from the respective wheel speed sensors 14. If it is determined in step 12 that the vehicle speed is equal to or lower than the reference value (step 12: YES), it is then determined whether the vehicle is being braked (step 14). This determination is made based on, for example, whether the brake control portion 102 is executing brake control. If it is determined in step 14 that the vehicle is being braked (step 14: YES), it is then determined whether a timer, which will be described later, is "on" (step 16).

If the timer is not "on" (step 16: NO), it is then determined based on the output signal of the pedal-travel sensor 46 whether the driver is now stepping the brake pedal 15 down (step 18). If the driver is not stepping down the brake pedal 15 down (step 18: YES), the brake control portion 102 maintains the wheel cylinder pressure at the brake hold pressure Ph (step 20), and the timer (not shown in the drawings) is set to "on" (step 22). The timer counts the brake hold duration $\Delta t$. On the other hand, if it is determined in step 16 that the timer is "on" (step 16: YES), the processes of steps 18 to 22 are skipped.

Then, whether the brake hold duration $\Delta t$ has passed is determined based on the value of the timer (step 24). If the brake hold duration $\Delta t$ has already passed (step 24: YES), the shift control portion 101 switches the shift range to the P range (step 26) and then sets the timer to "off" to finish the time count (step 28). Then, the brake control portion 102 gradually reduces the wheel cylinder pressure from the brake hold pressure Ph at a given pressure reducing gradient (step 30). On the other hand, if it is determined in step 24 that the brake hold duration Δt has not yet passed (step 24: NO), the present cycle of the routine is finished with the wheel cylinder pressure maintained at the brake hold pressure Ph and with the timer being kept "on".

On the other hand, if it is determined in step 10 that the P switch 61 is not "on" (step 10: NO), the present cycle of the routine is finished. Likewise, if it is determined in step 12 that the vehicle speed is higher than the reference speed (step 12: NO), the present cycle of the routine is finished. Likewise, if it is determined in step 14 that the vehicle is not being braked (step 14: NO), the present cycle of the routine is finished. Likewise, if it is determined in step 18 that the driver is stepping the brake pedal 15 down (step 18: "NO"), the present cycle of the routine is finished.

As described above, in this example embodiment, when the driver makes a request for switching the shift range to the P range despite that the vehicle has not yet stopped completely, the shift range is not immediately switched to the P range, and the wheel cylinder pressure is maintained at the brake hold pressure Ph. More specifically, the wheel cylinder pressure is maintained for the brake hold duration Δt and then the shift range is switched to the P range. This procedure ensures that the lock mechanism is actuated when the vehicle is in a stable state, and this eliminates or reduces the possibility of rocking of the vehicle which may make the driver feel unconformable.

Further, because the wheel cylinder pressure is gradually reduced from the brake hold pressure Ph at a given pressure reducing gradient after the lock mechanism is actuated, the shocks on the vehicle can be reduced and therefore the vehicle can be stopped in a more stable manner.

It is to be understood that the invention is not limited to the example embodiment. To the contrary, the invention is intended to cover various modifications and equivalent arrangements that can be made by those skilled in the art based on their knowledge.

For example, in the foregoing example embodiment, the vehicle is determined to have stopped completely when the brake hold duration Δt has passed. In other example embodiments, whether the vehicle has stopped completely may be determined directly from the output value of the G-sensor 21. That is, in this case, the brake hold duration is set to the time needed for the output value of the G-sensor 21 to converge on zero substantially, and the vehicle is determined to have stopped completely when the brake hold duration has passed, and then the shift range is switched to the P range.

Further, a vehicle height sensor for detecting the height of the vehicle may be provided. In this case, for example, when the difference between the vehicle height detected by the vehicle height sensor and the vehicle height that was detected in advance when the vehicle was not moving is smaller than a reference value, the vehicle is determined to have stopped completely, and then the shift range is switched to the P range.

Further, in the foregoing example embodiment, the wheel cylinder pressure is maintained by the ECB after the vehicle has stopped, and the wheel cylinder pressure is, after the brake hold duration Δt has passed, gradually reduced from the brake hold pressure Ph to release the braking force. In other example embodiments, the ECB and the EPB may be used cooperatively during the brake hold duration. However, because the power consumption of the EPB is typically large, the power consumption is saved by utilizing the pressure stored in the accumulator as the ECB does. In view of this, the ECB and the EPB may be used cooperatively only within the short time period in which to release the wheel cylinder pressure producing the braking force of the ECB. If the vehicle is first stabilized using the ECB before using the EPB, it reduces the possibility that the vehicle is lifted up at the time of actuating the EPB. In particular, in vehicles having a rear suspension structure involving an intermediate beam, noises from the linings of the drum brakes constituting the EPB can be suppressed. Further, if the actuation of the ECB and the actuation of the EPB are differently timed, it reduces the possibility of a voltage drop that may shut the system down unnecessarily.

Further, although not mentioned in the foregoing example embodiment, in order to prevent the shift range from being switched to the P range unnecessarily due to the P switch 61 being operated by mistake while the vehicle is running, the above-described shift control procedure may be executed only when the P switch 61 is kept pressed for a certain period of time. In this case, further, even when the vehicle is not being braked, if the P switch 61 is kept pressed for the certain period of time, the vehicle may be automatically braked by the ECB and the shift range may be switched to the P range when the vehicle has stopped.

Further, when the shift range is switched from the D range to the P range or from the R range to the P range, there is a possibility that the vehicle move due to the hydraulic fluid remaining in the automatic transmission. To prevent this, the gradient at which to release the braking force (the gradient at which to reduce the wheel cylinder pressure) may be reduced as needed. That is, a gradient guard may be set such that the hydraulic fluid is slowly discharged. In particular, at a low temperature, the viscosity of the hydraulic fluid in the automatic transmission is high, and therefore there is a possibility that a drive torque occurs due to the remaining fluid force when switching the shift range. Thus, the use of the aforementioned gradient guard is effective to maintain the vehicle in a stopped state.

Further, in vehicles in which the shift range is automatically switched to the P range when a power supply failure occurs, in order to prevent the shift range from being switched to the P range while the vehicle is running, other power supply (e.g., the capacitors of the ECB) may be used until the vehicle stops upon a power supply failure.

Further, while the automatic transmission 2 of the foregoing example embodiment is a multi-speed transmission, it may instead be a continuously variable transmission.

The invention claimed is:

1. A shift control system that controls a power transfer state of a power transfer mechanism of a vehicle in accordance with a shift operation by a driver, comprising:
   a shift operation input portion to which a shift operation by the driver is input;
   a shift control portion that switches a shift range in accordance with the shift operation by the driver and electrically controls the power transfer state of the power transfer mechanism;
   a brake control portion that applies braking force to wheels of the vehicle by controlling a wheel cylinder pressure by controlling the opening and closing of an electromagnetic valve provided in a hydraulic circuit in response to a brake pedal being stepped down; and
   a vehicle speed detection portion that detects the speed of the vehicle, wherein
   when a shift operation requesting the shift range to be switched to a parking range is input while the vehicle is running, the shift control portion maintains the wheel cylinder pressure at a given hold pressure for at least a given hold duration which is a predetermined duration within which the vehicle is estimated to stop, and after the hold duration has passed, the shift control portion switches the shift range to the parking range by actuating a lock mechanism that locks the output shaft of the power transfer mechanism, and the shift control system further comprising a brake operation detection portion that detects the operation state of the brake pedal, wherein when the vehicle speed detected by the vehicle speed detection portion has become substantially zero and the amount of depression of the brake pedal has become substantially zero, the shift control portion causes the brake control portion to start maintaining the wheel cylinder pressure at the hold pressure which is lower than a wheel cylinder pressure obtained when the brake pedal is being stepped down.

2. The shift control system according to claim 1, further comprising:

a stop state determination portion that determines, based on the behavior of the vehicle, whether the vehicle has stopped, wherein the hold duration is set to a time period until the stop state determination portion determines that the vehicle has stopped.

3. The shift control system according to claim 2, further comprising:

a sensor that detects the deceleration of the vehicle, wherein the stop state determination portion determines that the vehicle has stopped when the vehicle speed detected by the vehicle speed detection portion has become substantially zero and the output value of the sensor has substantially converged on zero.

4. The shift control system according to claim 2, further comprising:

a vehicle height sensor that detects a height of the vehicle, wherein the stop state determination portion determines that the vehicle has stopped when the vehicle speed detected by the vehicle speed detection portion has become substantially zero and the difference between a current vehicle height detected by the vehicle height sensor and a vehicle height that was detected in advance when the vehicle was not moving is smaller than a reference value.

5. The shift control system according to claim 1, wherein the larger a deceleration of the vehicle at a given time point immediately before the vehicle stops, the shorter the given hold duration is predetermined to be.

6. The shift control system according to claim 5, further comprising a sensor that detects the deceleration of the vehicle, wherein the shift control portion predetermines the given hold duration based on the deceleration of the vehicle detected by the sensor and a control map determined in advance of an operation of the vehicle.

7. The shift control system according to claim 1, wherein after switching the shift range to the parking range, the shift control portion causes the brake control portion to reduce the wheel cylinder pressure gradually from the hold pressure.

8. The shift control system according to claim 7, wherein the shift control portion causes the brake control portion to reduce the wheel cylinder pressure gradually from the hold pressure according to a pressure reducing gradient.

9. A shift control method for controlling a power transfer state of a power transfer mechanism of a vehicle in accordance with a shift operation by a driver, comprising:

determining whether a shift operation requesting the shift range to be switched to a parking range has been input while the vehicle is running;

determining whether the speed of the vehicle is lower than a reference value;

maintaining the pressure of a brake wheel cylinder at a given hold pressure for a given hold duration if a shift operation requesting the shift range to be switched to the parking range has been input and the vehicle speed is equal to or lower than the reference value; and switching the shift range to the parking range after the hold duration has passed.

10. The shift control method according to claim 9, furthering comprising gradually reducing the wheel cylinder pressure from the hold pressure according to a pressure reducing gradient after the shift range is switched to the parking range.

11. The shift control method according to claim 9, furthering comprising determining an operation state of a brake pedal, wherein maintaining the pressure of a brake wheel cylinder at the given hold pressure for the given hold duration occurs when the operation state of the brake pedal is in an OFF state.

12. The shift control method according to claim 11, wherein maintaining the pressure of the brake wheel cylinder at the given hold pressure for the given hold duration further comprises, determining a deceleration of the vehicle, and setting the given hold duration to be shorter the larger the deceleration of the vehicle.

\* \* \* \* \*